United States Patent
Park et al.

(10) Patent No.: US 7,012,821 B1
(45) Date of Patent: Mar. 14, 2006

(54) FLYBACK CONVERTER WITH SYNCHRONOUS RECTIFIER

(75) Inventors: Tae Ook Park, Anyang (KR); Sung Cheol Kim, Suwon (KR); Chan Gyu Jang, Hwasung (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/998,932

(22) Filed: Nov. 30, 2004

(30) Foreign Application Priority Data

Oct. 7, 2004 (KR) ...................... 10-2004-0080004

(51) Int. Cl.
*H02M 3/335* (2006.01)

(52) U.S. Cl. ............... 363/21.12; 363/21.14; 363/21.17

(58) Field of Classification Search ............. 363/21.12, 363/21.14, 21.16, 21.17, 21.18
See application file for complete search history.

(56) References Cited

U.S. PATENT DOCUMENTS

| | | | |
|---|---|---|---|
| 6,185,114 B1 * | 2/2001 | Matsumoto et al. ..... | 363/21.06 |
| 6,353,544 B1 | 3/2002 | Lau | |
| 6,442,048 B1 * | 8/2002 | Sun et al. ................ | 363/21.14 |
| 6,462,965 B1 * | 10/2002 | Uesono ................... | 363/21.14 |
| 6,618,274 B1 * | 9/2003 | Boylan et al. ................ | 363/17 |
| 6,639,813 B1 * | 10/2003 | Yamagishi et al. ....... | 363/21.12 |
| 6,678,172 B1 * | 1/2004 | Zhang et al. ............ | 363/21.14 |
| 6,791,849 B1 * | 9/2004 | Nakayama ............... | 363/21.14 |

* cited by examiner

*Primary Examiner*—Bao Q. Vu
(74) *Attorney, Agent, or Firm*—Lowe Hauptman & Berner, LLP (57) ABSTRACT

Disclosed herein is a flyback converter with a synchronous rectifier which is applied to a power supply of a portable computer such as a notebook PC. The flyback converter is operated in a critical conduction mode to turn on/off a main switch at a zero crossing point of an output voltage. The flyback converter is also adapted to control the duty cycle of a synchronous switch using a Zener diode. Therefore, there is no need for a Schottky diode to be connected in parallel with the synchronous switch, resulting in simplification in circuit design.

20 Claims, 9 Drawing Sheets

PRIOR ART
FIG.1

PRIOR ART

PRIOR ART

FIG. 4a

PRIOR ART

FIG. 4b

PRIOR ART

FLYBACK CONVERTER WITH SYNCHRONOUS RECTIFIER

RELATED APPLICATIONS

The present application is based on, and claims priority from, Korean Application Number 2004-80004, filed Oct. 7, 2004, the disclosure of which is incorporated by reference herein in its entirety.

BACKGROUND OF THE INVENTION

1. Field of the Invention

The present invention relates to a flyback converter which is applied to a power supply of a portable computer such as a notebook PC, and more particularly to a flyback converter with a synchronous rectifier which is operated in a critical conduction mode to turn on/off a main switch at a zero crossing point of an output voltage and is adapted to control the duty cycle of a synchronous switch using a Zener diode, resulting in no need for a Schottky diode to be connected in parallel with the synchronous switch and, thus, simplification in circuit design.

2. Description of the Related Art

Recently, electronic and electric appliances have had an increasing number of functions desired by customers, have been increasingly digitized to perform such multiple functions, and have keenly required a small-size, high-efficiency power supply to provide services appropriate to the customers' various desires.

Among existing power supplies, a flyback power supply is most widely used owing to the advantage of having a smaller number of components enabling lower-cost production and miniaturization.

However, recently, electronic and electric appliances have required a lower-voltage, larger-current power supply, so that a diode rectifier system for an existing flyback converter cannot meet smallness, thinness and high-efficiency conditions desired by the customers any longer. Furthermore, since loss occurs in proportion to output current, the diode rectifier system may suffer excessive loss if the output current is large.

In this connection, a synchronous rectifier system using a semiconductor switch with small conduction loss, such as a MOS (Metal-Oxide Semiconductor) transistor, has been proposed to replace the diode rectifier system.

Figure 1:
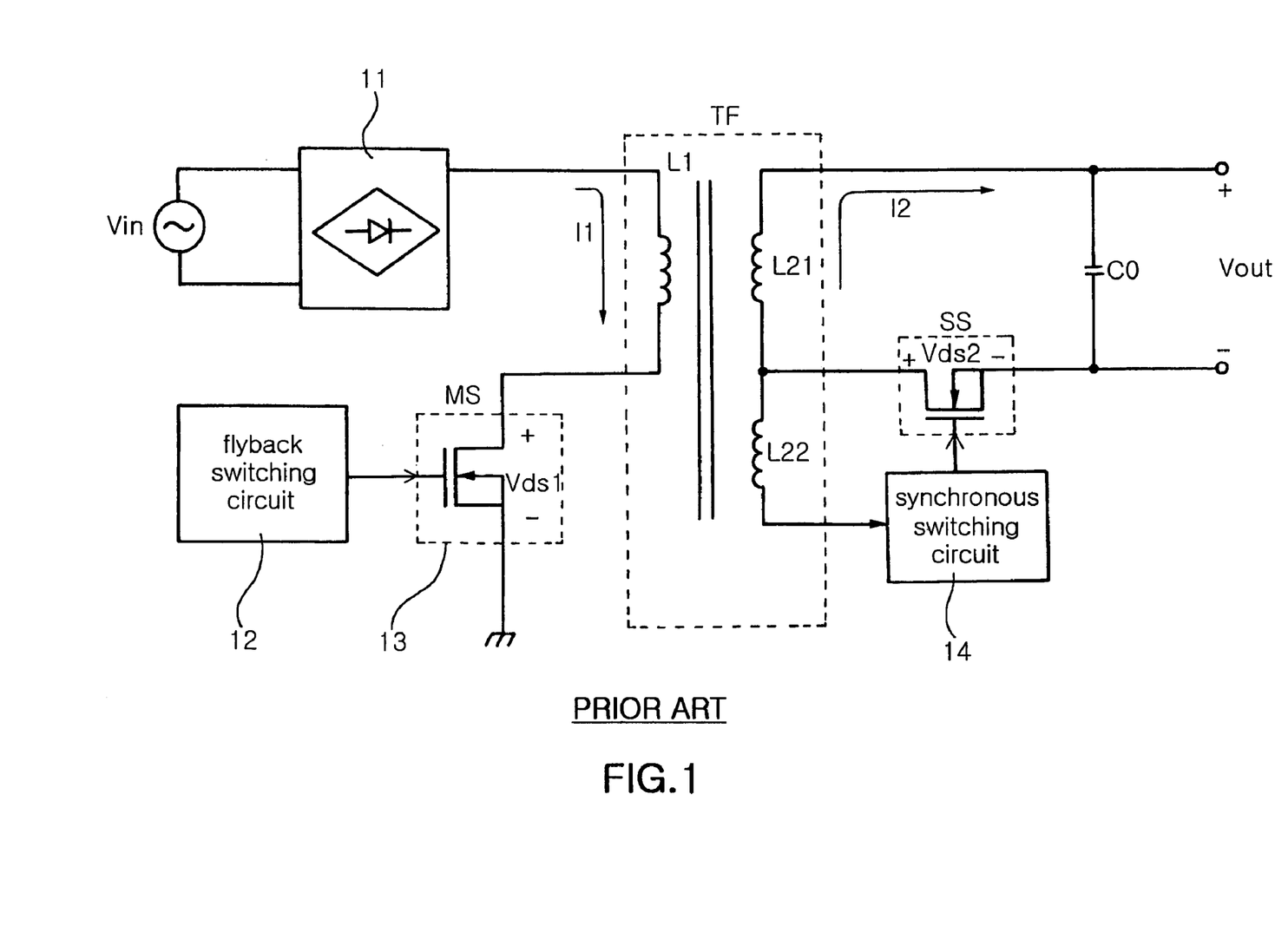
FIG. 1 is a circuit diagram illustrating the concept of a general flyback converter.
Figure 2:
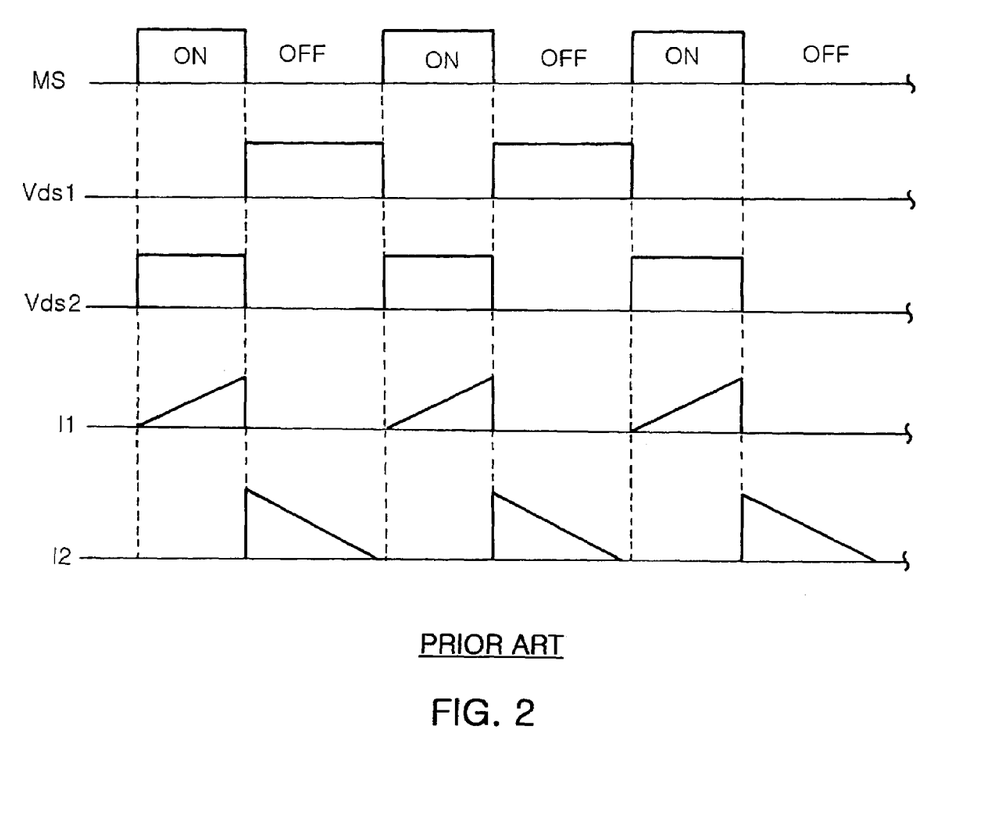
FIG. 2 is a timing diagram of main signals in FIG. 1.

FIG. 1 is a circuit diagram illustrating the concept of a general flyback converter, and FIG. 2 is a timing diagram of main signals in FIG. 1.

In FIGS. 1 and 2, an alternating current (AC) input voltage Vin is rectified by a rectifier 11 and then provided to a transformer TF. At this time, a flyback switching circuit 12 switches a main switch MS, so that the main switch MS is turned on/off repeatedly as shown in FIG. 2.

A drain-source voltage Vds1 of the main switch MS varies with the on/off operation of the main switch MS, as shown in FIG. 2.

That is, if the main switch MS is turned on, primary current I1 flows in a primary coil L1 of the transformer TF through the main switch MS, as shown in FIG. 2, and, at the same time, a synchronous switch SS is turned off by a synchronous switching circuit 14. At the time that the main switch MS is turned off, the synchronous switch SS is turned on by the synchronous switching circuit 14, so that energy in the primary coil L1 of the transformer TF is induced to a secondary main coil L21 of the transformer TF, thereby causing secondary current I2 to flow as shown in FIG. 2.

Here, Vds1 is a voltage applied across the main switch MS, and Vds2 is a voltage applied across the synchronous switch SS.

The drain-source voltage Vds2 of the synchronous switch SS varies with the on/off operation of the synchronous switch SS, as shown in FIG. 2. Here, the synchronous switching circuit 14 is supplied with a driving voltage from a secondary auxiliary coil L22 of the transformer TF connected to the secondary main coil L21 thereof.

Through this process, a voltage in the secondary main coil L21 of the transformer TF is supplied as an output voltage Vout via an output capacitor Co.

As can be seen from the above description, the synchronous switching circuit 14 for the synchronous switch SS is turned on/off synchronously with the flyback switching circuit 12, so the synchronous switch SS, which is a MOS transistor, acts as a rectifier.

This flyback converter can be classified into various types according to technical details, such as driving methods for the main switch and synchronous switch and the design of a driving circuit for the synchronous switch, and one example of flyback converters of such various types will hereinafter be described with reference to FIGS. 3 and 4.

Figure 3:
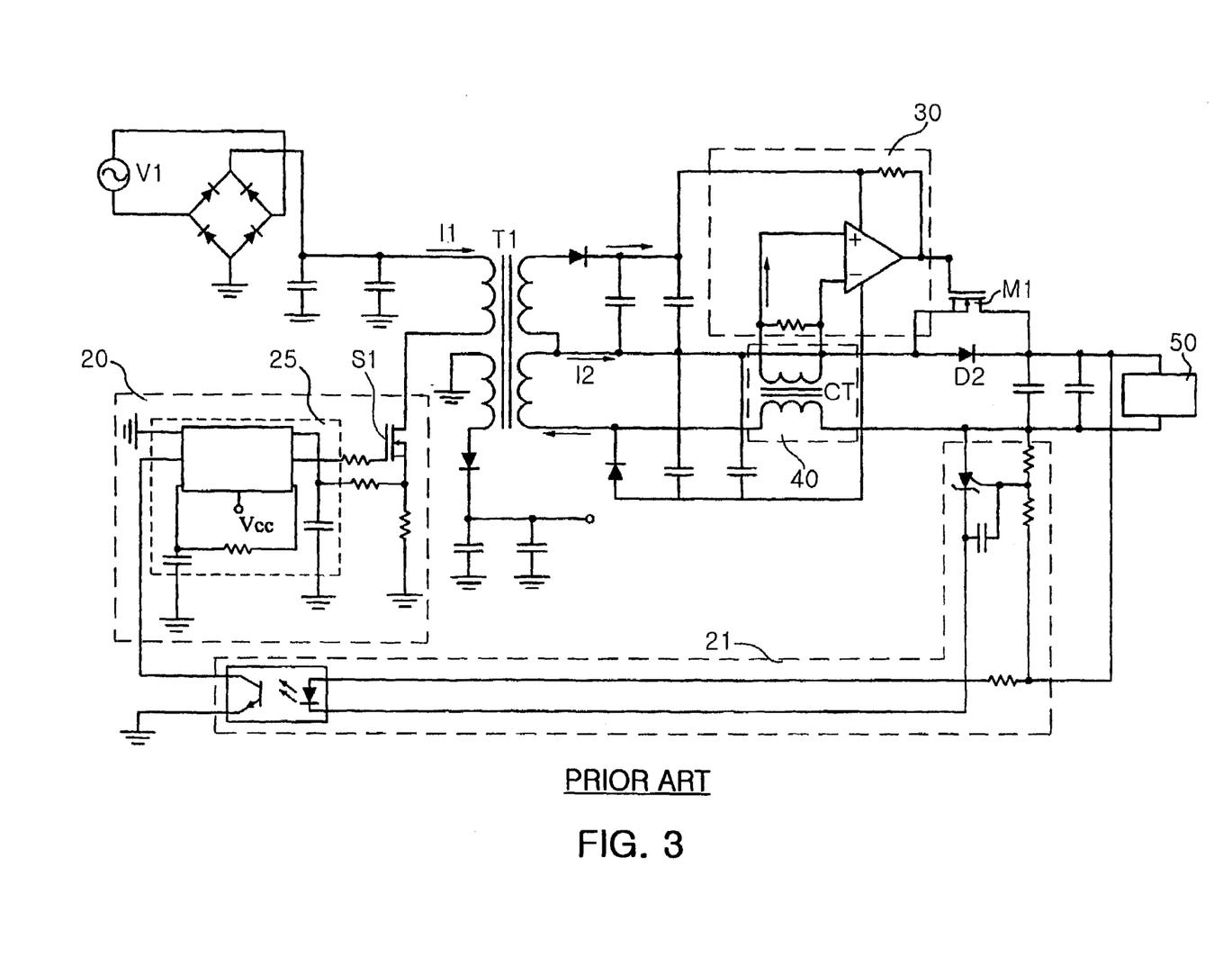
FIG. 3 is a circuit diagram of a conventional flyback converter.

FIG. 3 is a circuit diagram of a conventional flyback converter.

With reference to FIG. 3, the conventional flyback converter comprises a voltage source, a flyback switching circuit 20 for receiving a voltage from the voltage source and outputting a high-frequency pulse to a switch S1, a transformer T1 having a primary coil connected to the flyback switching circuit 20 for receiving the high-frequency pulse therefrom, and two secondary coils acting as a master source and a sub-source, respectively, a synchronous rectifier 30 connected to a current sensor 40 and the sub-source for outputting a driving pulse, and a synchronous switch M1 connected in parallel with an output diode D2 for receiving the driving pulse from the synchronous rectifier 30. The output diode D2 has one end connected to the master source and the other end connected to a load 50, which is in turn connected in parallel with an output capacitor. The current sensor 40 is connected in series to the load 50 to detect load current. The current sensor 40 also acts to transfer the detected load current to the synchronous rectifier 30. Here, V1 denotes a power source, 21 denotes a feedback circuit, and 25 denotes a gate control circuit.

Details of the flyback converter of FIG. 3 are disclosed in U.S. Pat. No. 6,353,544.

Figure 4A:
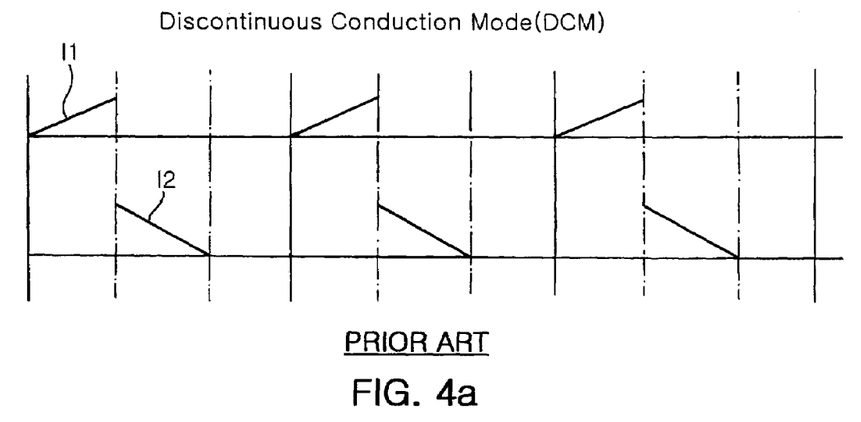
FIGS. 4a and 4b are waveform diagrams of currents in respective operation modes of the flyback converter of FIG. 3.
Figure 4B:
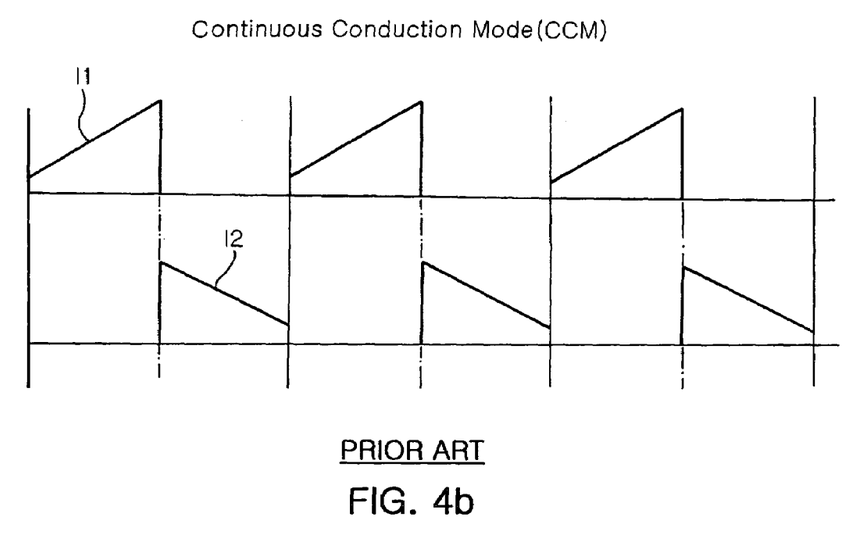

FIGS. 4a and 4b are waveform diagrams of currents in respective operation modes of the flyback converter of FIG. 3.

With reference to FIGS. 3 to 4b, in the conventional flyback converter, the switch S1 is operated at a fixed frequency, so that it is appropriate to a discontinuous conduction mode (DCM) of FIG. 4a and a continuous conduction mode (CCM) of FIG. 4b.

Figure 5:
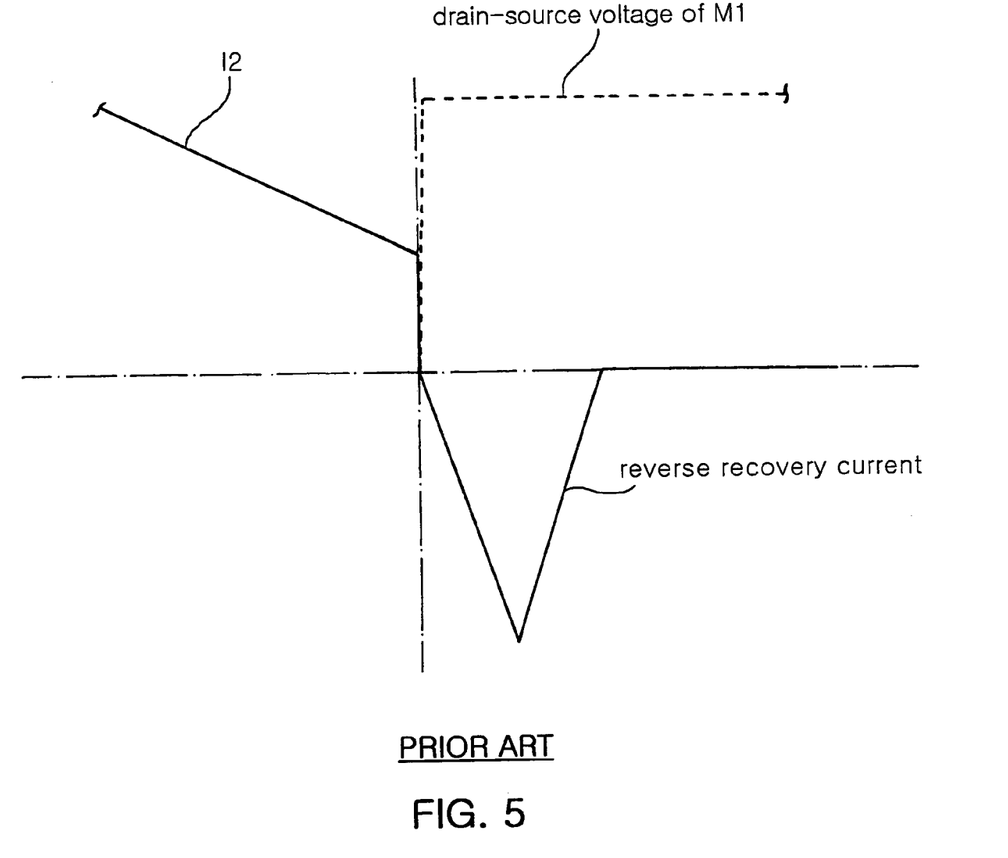
FIG. 5 is a waveform diagram of reverse recovery current in the flyback converter of FIG. 3.

FIG. 5 is a waveform diagram of reverse recovery current in the flyback converter of FIG. 3.

In the conventional flyback converter of FIG. 3, in the CCM, which is a main operation mode of the flyback converter, while a large amount of secondary current I2 flows, the synchronous switch M1 is turned off at the moment that the switch S1 is turned on. In this case, reverse recovery current (RRC) may be instantaneously generated due to PN junction characteristics of the synchronous switch M1. In order to prevent such RRC from being generated, the output diode D2, which is a Schottky diode, is connected in parallel with the synchronous switch M1. That is, the generation of RRC is prevented by a Schottky diode with little reverse recovery time.

However, the aforementioned conventional flyback converter is disadvantageous in that the synchronous switch driving circuit is complicated because the secondary auxiliary coil is necessary for supply of a driving voltage to the synchronous switch and the flyback converter is operated in both the DCM and CCM. Moreover, in order to prevent the generation of RRC, the Schottky diode must be connected in parallel with the synchronous switch, causing reduction in available area of a printed circuit board (PCB) and, in turn, increase in production cost.

SUMMARY OF THE INVENTION

Therefore, the present invention has been made in view of the above problems, and it is an object of the present invention to provide a flyback converter with a synchronous rectifier which is operated in a critical conduction mode to turn on/off a main switch at a zero crossing point of an output voltage and is adapted to control the duty cycle of a synchronous switch using a Zener diode, resulting in no need for a Schottky diode to be connected in parallel with the synchronous switch and, thus, simplification in circuit design.

In accordance with an aspect of the present invention, the above and other objects can be accomplished by the provision of a flyback converter with a synchronous rectifier, comprising: a flyback switching controller for switching a main switch in a critical conduction mode on the basis of a feedback voltage to convert an input voltage into a high-frequency pulse; a transformer having a primary coil for receiving the high-frequency pulse, and secondary main and auxiliary coils; a synchronous switch including a MOSFET having a source and drain connected to any one of first and second output lines connected respectively to both ends of the secondary main coil; a feedback controller for detecting an output voltage between the first output line and the second output line and outputting the detected voltage as the feedback voltage to the flyback switching controller; a voltage detector for detecting a voltage across the secondary auxiliary coil; a turn-on switch for switching a connection between an output terminal of the voltage detector and a gate of the synchronous switch according to a voltage at a common control terminal connected to the output terminal of the voltage detector through a common resistor; a turn-off switch for switching a connection between the gate and source of the synchronous switch according to the voltage at the common control terminal connected to the output terminal of the voltage detector through the common resistor; a current detector having primary and secondary coils for current detection, the current detector detecting load current flowing in any one of the first and second output lines according to a turn ratio between the primary and secondary current detection coils thereof; a current/voltage converter for converting the load current detected by the current detector into a voltage; and a ground switch for switching a connection between the common control terminal and the source of the synchronous switch according to the voltage converted by the current/voltage converter.

In accordance with another aspect of the present invention, there is provided a flyback converter with a synchronous rectifier, comprising: a flyback switching controller for switching a main switch in a critical conduction mode on the basis of a feedback voltage to convert an input voltage into a high-frequency pulse; a transformer having a primary coil for receiving the high-frequency pulse and a secondary coil; a synchronous switch including a MOSFET having a source and drain connected to any one of first and second output lines connected respectively to both ends of the secondary coil; a feedback controller for detecting an output voltage between the first output line and the second output line and outputting the detected voltage as the feedback voltage to the flyback switching controller; a voltage detector for detecting a voltage across the secondary coil; a turn-on switch for switching a connection between an output terminal of the voltage detector and a gate of the synchronous switch according to a voltage at a common control terminal connected to the output terminal of the voltage detector through a common resistor; a turn-off switch for switching a connection between the gate and source of the synchronous switch according to the voltage at the common control terminal connected to the output terminal of the voltage detector through the common resistor; a current detector having primary and secondary coils for current detection, the current detector detecting load current flowing in any one of the first and second output lines according to a turn ratio between the primary and secondary current detection coils thereof; a current/voltage converter for converting the load current detected by the current detector into a voltage; and a ground switch for switching a connection between the common control terminal and the source of the synchronous switch according to the voltage converted by the current/voltage converter.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 6:
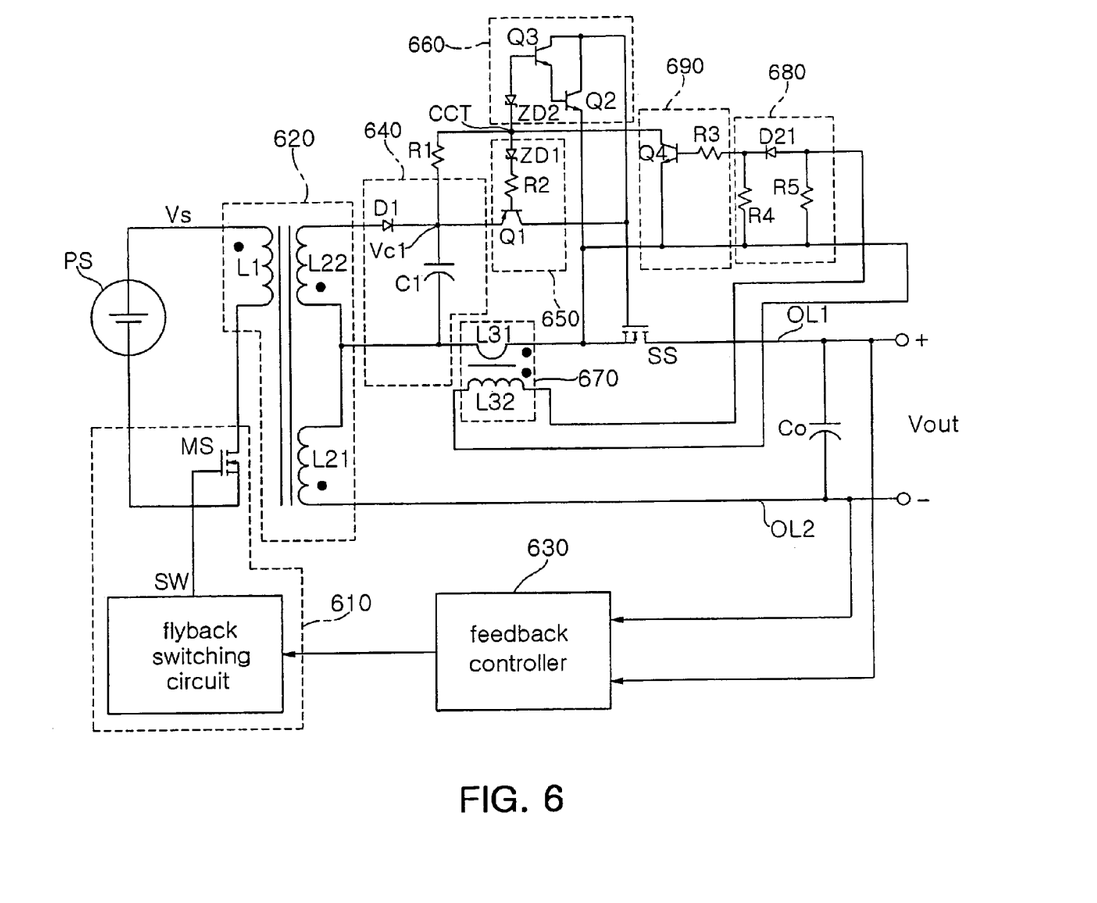
FIG. 6 is a circuit diagram showing the configuration of a first embodiment of a flyback converter according to the present invention.

FIG. 6 is a circuit diagram showing the configuration of a first embodiment of a flyback converter according to the present invention.

With reference to FIG. 6, in the first embodiment, the flyback converter according to the present invention comprises a flyback switching controller 610 for switching a main switch MS in a critical conduction mode on the basis of a feedback voltage to convert a voltage Vs into a high-frequency pulse, a transformer 620 having a primary coil L1 for receiving the high-frequency pulse, and secondary main and auxiliary coils L21 and L22, a feedback controller 630 for detecting an output voltage between first and second output lines OL1 and OL2 connected respectively to both ends of the secondary main coil L21 and outputting the detected voltage as the feedback voltage to the flyback switching controller 610, and a synchronous switch SS composed of a MOSFET having a source and drain connected to the first output line OL1. The flyback converter further comprises a voltage detector 640 for detecting a voltage across the secondary auxiliary coil L22, a turn-on switch 650 for switching a connection between an output terminal of the voltage detector 640 and a gate of the synchronous switch SS according to a voltage at a common control terminal CCT connected to the output terminal of the voltage detector 640 through a common resistor R1, a turn-off switch 660 for switching a connection between the gate and source of the synchronous switch SS according to the voltage at the common control terminal CCT connected to the output terminal of the voltage detector 640 through the common resistor R1, and a current detector 670 having primary and secondary coils L31 and L32 for current detection. The current detector 670 acts to detect load current flowing in the first output line OL1 according to a turn ratio between the primary and secondary current detection coils L31 and L32 thereof. The flyback converter further comprises a current/voltage converter 680 for converting the load current detected by the current detector 670 into a voltage, and a ground switch 690 for switching a connection between the common control terminal CCT and the source of the synchronous switch SS according to the voltage converted by the current/voltage converter 680.

The voltage detector 640 includes a diode D1 having an anode connected to a positive voltage terminal of the secondary auxiliary coil L22, and a capacitor C1 connected between a negative voltage terminal of the secondary auxiliary coil L22 and a cathode of the diode D1. With this configuration, the voltage detector 640 provides an output voltage VC1 through the capacitor C1.

The turn-on switch 650 includes a first transistor Q1 of a PNP type having an emitter connected to the output terminal of the voltage detector 640 and a collector connected to the gate of the synchronous switch SS, and a first Zener diode ZD1 having a cathode connected to a base of the first transistor Q1 and an anode connected to the common control terminal CCT.

The first Zener diode ZD1 preferably has a breakdown voltage lower than the voltage detected by the voltage detector 640.

The turn-off switch 660 includes a second transistor Q2 of an NPN type having a collector connected to the gate of the synchronous switch SS and an emitter connected to the source of the synchronous switch SS, a third transistor Q3 of the NPN type having a collector connected to the collector of the second transistor Q2 and an emitter connected to a base of the second transistor Q2, and a second Zener diode ZD2 having an anode connected to a base of the third transistor Q3 and a cathode connected to the common control terminal CCT.

The second Zener diode ZD2 preferably has a breakdown voltage lower than the voltage detected by the voltage detector 640. The output voltage from the voltage detector 640 is preferably lower than the sum of the breakdown voltages of the first and second Zener diodes ZD1 and ZD2.

The current detector 670 functions to adjust an on time of the turn-off switch 660 according to the turn ratio between the primary and secondary current detection coils L31 and L32 thereof. The turn ratio between the primary and secondary current detection coils L31 and L32 of the current detector 670 is preferably set to turn on the turn-off switch 660 at a predetermined time before the main switch MS is turned on.

The current/voltage converter 680 includes a voltage detection resistor R5 for detecting a voltage corresponding to the load current detected by the current detector 670, a diode D21 for rectifying the voltage detected by the voltage detection resistor R5, and an output resistor R4 connected between the current detector 670 and a cathode of the diode D21 for outputting the voltage rectified by the diode D21.

The ground switch 690 is composed of a fourth transistor Q4 of the NPN type having a collector connected to the common control terminal CCT, a base connected to an output terminal of the current/voltage converter 680 through a resistor R3 and an emitter connected to the source of the synchronous switch SS.

Figure 7:
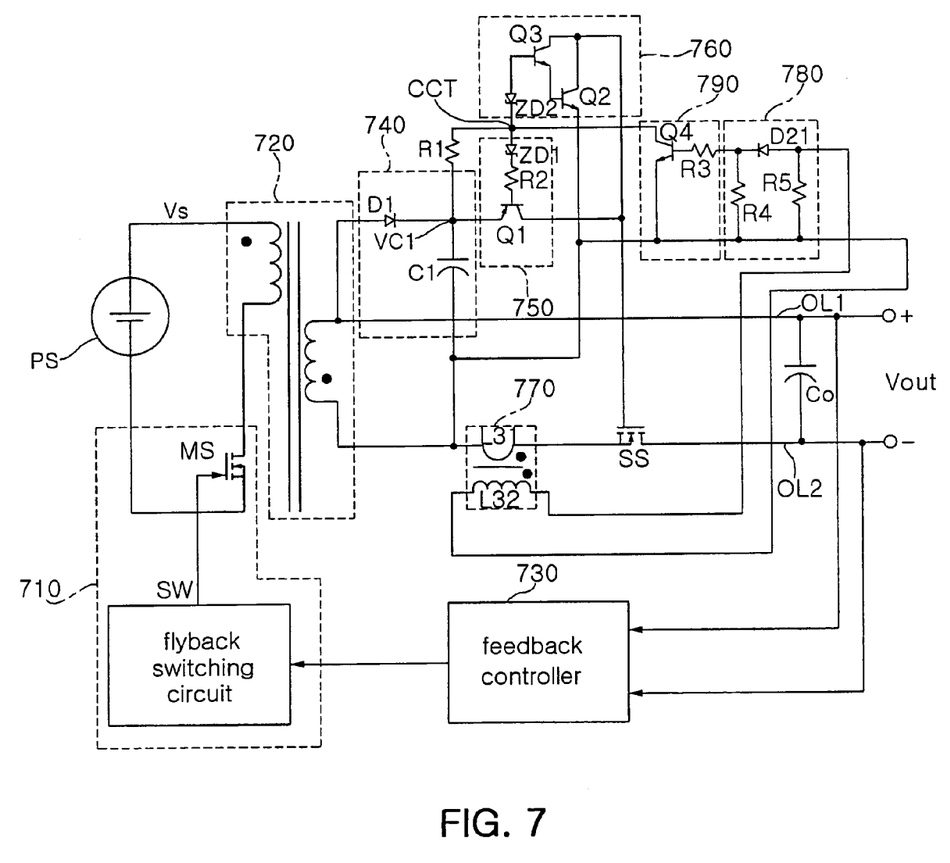
FIG. 7 is a circuit diagram showing the configuration of a second embodiment of the flyback converter according to the present invention.

FIG. 7 is a circuit diagram showing the configuration of a second embodiment of the flyback converter according to the present invention.

With reference to FIG. 7, in the second embodiment, the flyback converter according to the present invention comprises a flyback switching controller 710 for switching a main switch MS in a critical conduction mode on the basis of a feedback voltage to convert a voltage Vs into a high-frequency pulse, a transformer 720 having a primary coil L1 for receiving the high-frequency pulse and a secondary coil L2, a feedback controller 730 for detecting an output voltage between first and second output lines OL1 and OL2 connected respectively to both ends of the secondary coil L2 and outputting the detected voltage as the feedback voltage to the flyback switching controller 710, a synchronous switch SS composed of a MOSFET having a source and drain connected to the second output line OL2, and a voltage detector 740 for detecting a voltage across the secondary coil L2. The flyback converter further comprises a turn-on switch 750 for switching a connection between an output terminal of the voltage detector 740 and a gate of the synchronous switch SS according to a voltage at a common control terminal CCT connected to the output terminal of the voltage detector 740 through a common resistor R1, a turn-off switch 760 for switching a connection between the gate and source of the synchronous switch SS according to the voltage at the common control terminal CCT connected to the output terminal of the voltage detector 740 through the common resistor R1, and a current detector 770 having primary and secondary coils L31 and L32 for current detection. The current detector 770 acts to detect load current flowing in the second output line OL2 according to a turn ratio between the primary and secondary current detection coils L31 and L32 thereof. The flyback converter further comprises a current/voltage converter 780 for converting the load current detected by the current detector 770 into a voltage, and a ground switch 790 for switching a connection between the common control terminal CCT and the source of the synchronous switch SS according to the voltage converted by the current/voltage converter 780.

The voltage detector 740 includes a diode D1 having an anode connected to a positive voltage terminal of the secondary coil L2, and a capacitor C1 connected between a negative voltage terminal of the secondary coil L2 and a cathode of the diode D1. With this configuration, the voltage detector 740 provides an output voltage VC1 through the capacitor C1.

The turn-on switch 750 includes a first transistor Q1 of a PNP type having an emitter connected to the output terminal of the voltage detector 740 and a collector connected to the gate of the synchronous switch SS, and a first Zener diode ZD1 having a cathode connected to a base of the first transistor Q1 and an anode connected to the common control terminal CCT.

The first Zener diode ZD1 preferably has a breakdown voltage lower than the voltage detected by the voltage detector 740.

The turn-off switch 760 includes a second transistor Q2 of an NPN type having a collector connected to the gate of the synchronous switch SS and an emitter connected to the source of the synchronous switch SS, a third transistor Q3 of the NPN type having a collector connected to the collector of the second transistor Q2 and an emitter connected to a base of the second transistor Q2, and a second Zener diode ZD2 having an anode connected to a base of the third transistor Q3 and a cathode connected to the common control terminal CCT.

The second Zener diode ZD2 preferably has a breakdown voltage lower than the voltage detected by the voltage detector 740. The output voltage from the voltage detector 740 is preferably lower than the sum of the breakdown voltages of the first and second Zener diodes ZD1 and ZD2.

The current detector 770 functions to adjust an on time of the turn-off switch 760 according to the turn ratio between the primary and secondary current detection coils L31 and L32 thereof. The turn ratio between the primary and secondary current detection coils L31 and L32 of the current detector 770 is preferably set to turn on the turn-off switch 760 at a predetermined time TD before the main switch MS is turned on.

The current/voltage converter 780 includes a voltage detection resistor R5 for detecting a voltage corresponding to the load current detected by the current detector 770, a diode D21 for rectifying the voltage detected by the voltage detection resistor R5, and an output resistor R4 connected between the current detector 770 and a cathode of the diode D21 for outputting the voltage rectified by the diode D21.

The ground switch 790 is composed of a fourth transistor Q4 of the NPN type having a collector connected to the common control terminal CCT, a base connected to an output terminal of the current/voltage converter 780 through a resistor R3 and an emitter connected to the source of the synchronous switch SS.

Here, the reference character Co, not described, denotes an output capacitor.

Figure 8:
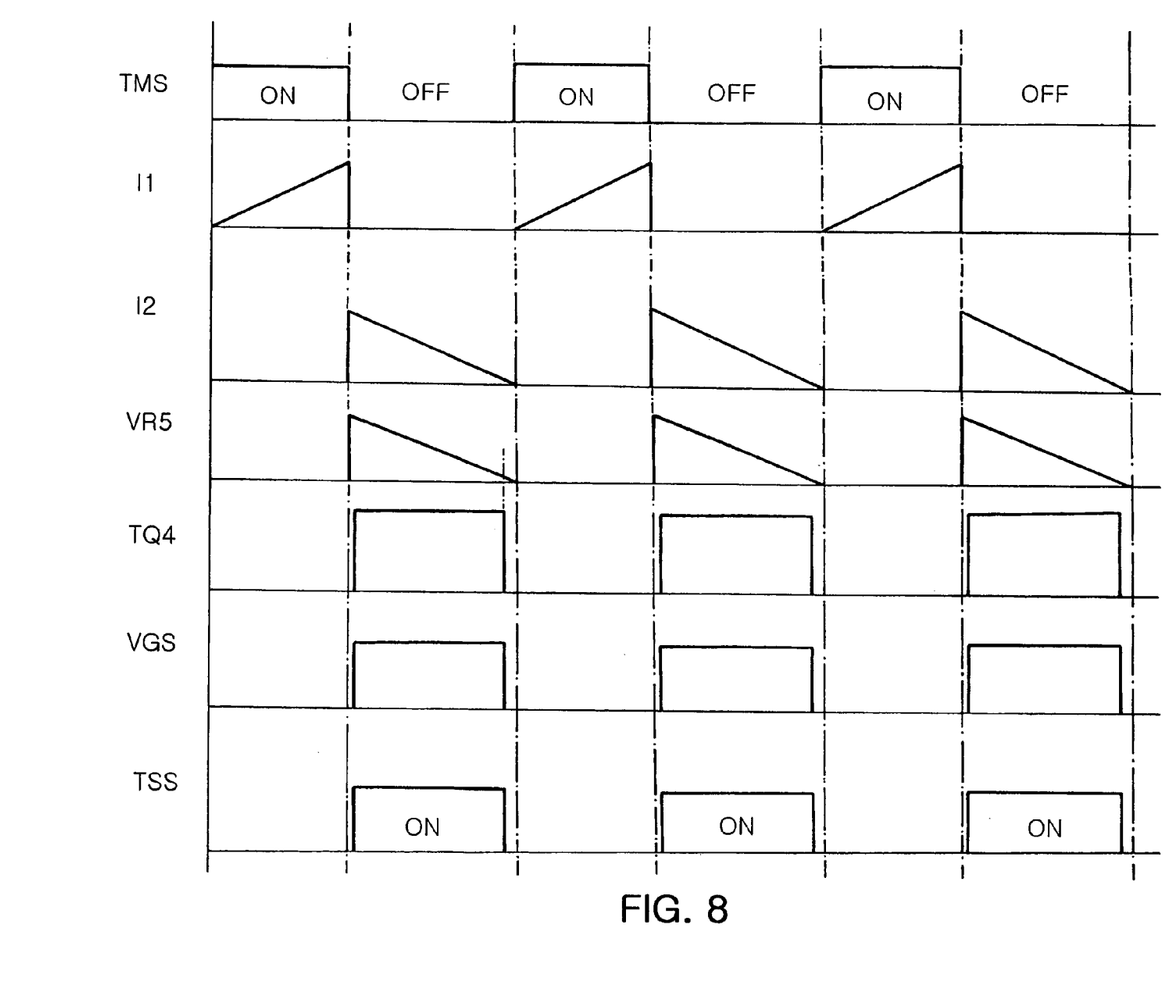
FIG. 8 is a timing diagram of main signals in the flyback converter according to the present invention.

FIG. 8 is a timing diagram of main signals in the flyback converter according to the present invention.

In FIG. 8, TMS represents an on/off timing of the main switch MS, I1 represents primary current of the transformer, I2 represents secondary current of the transformer, VR5 represents the voltage detected by the voltage detection resistor R5, TQ4 represents an on/off timing of the fourth transistor Q4 of the ground switch, VGS represents a gate-source voltage of the synchronous switch SS, and TSS represents an on/off timing of the synchronous switch SS.

Figure 9:
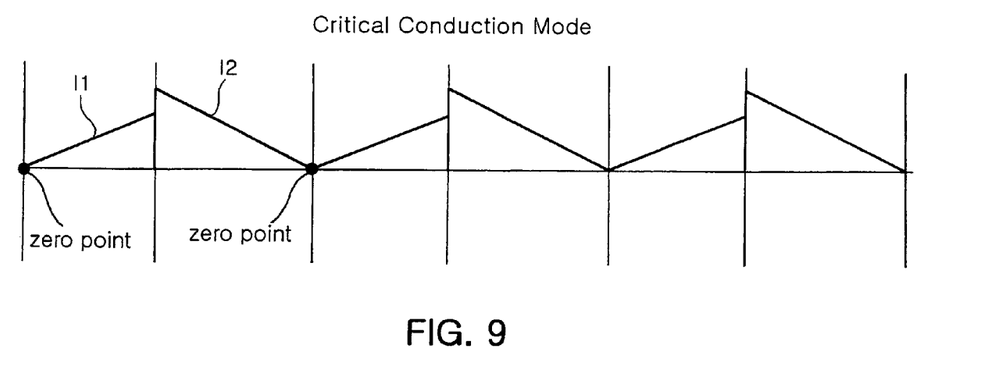
FIG. 9 is a waveform diagram of currents in the flyback converter according to the present invention.

FIG. 9 is a waveform diagram of currents in the flyback converter according to the present invention.

In FIG. 9, I1 represents the primary current of the transformer and I2 represents the secondary current of the transformer. As can be seen from this drawing, the synchronous rectifier driving circuit is operated in a critical conduction mode where the primary current begins to flow at a zero point and the flow of the secondary current is terminated at another zero point.

Figure 10:
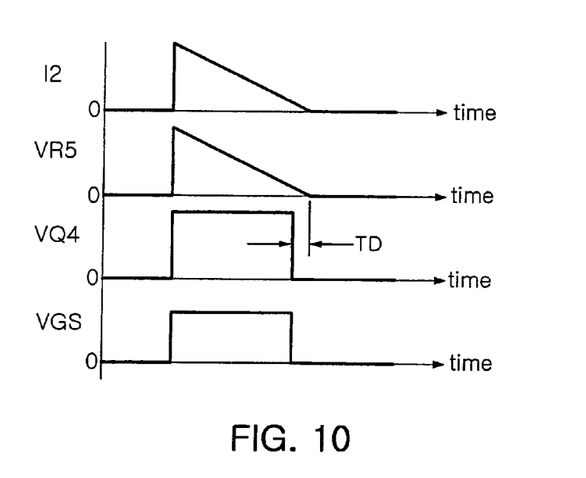
FIG. 10 is a timing diagram illustrating the operation of a synchronous switch in the flyback converter according to the present invention.

FIG. 10 is a timing diagram illustrating the operation of the synchronous switch SS in the flyback converter according to the present invention.

In FIG. 10, I2 represents the secondary current of the transformer, VR5 represents the voltage detected by the voltage detection resistor R5, TQ4 represents the on/off timing of the fourth transistor Q4 of the ground switch, and VGS represents the gate-source voltage of the synchronous switch SS.

Next, a detailed description will be given of the operation of the flyback converter according to the present invention in conjunction with the annexed drawings.

First, the first embodiment of the flyback converter according to the present invention will be described with reference to FIGS. 6, 8, 9 and 10.

With reference to FIG. 6, in the first embodiment, the flyback switching controller 610 switches the main switch MS in the critical conduction mode on the basis of a feedback voltage to convert the voltage Vs into a high-frequency pulse. This high-frequency pulse is induced from the primary coil L1 of the transformer 620 to both the secondary main and auxiliary coils L21 and L22 thereof.

At this time, the feedback controller 630 detects an output voltage between the first output line OL1 and the second output line OL2 connected respectively to both ends of the secondary main coil L21, and outputs the detected voltage as the feedback voltage to the flyback switching controller 610.

As shown in FIG. 8, the primary current I1 flows in the primary coil L1 of the transformer 620 when the main switch MS is turned on in response to a switching signal SW, and the secondary current I2 flows in the secondary main and auxiliary coils L21 and L22 of the transformer 620 when the main switch MS is turned off in response to the switching signal SW.

This operation is performed in the critical conduction mode. That is, in the critical conduction mode applied to the flyback converter of the present invention, the primary current begins to flow at a zero point and the flow of the secondary current is terminated at another zero point, as shown in FIG. 9, by means of the flyback switching controller 610 and feedback controller 630.

Meanwhile, the synchronous switch SS can be connected to any one of the first output line OL1 or second output line OL2 of the transformer 620. In the first embodiment, as shown in FIG. 6, the synchronous switch SS is implemented with a MOS transistor connected to the first output line OL1.

Referring again to FIG. 6, if the secondary current I2 flows, the voltage detector 640 detects a voltage across the secondary auxiliary coil L22. That is, in the voltage detector 640, the diode D1 rectifies the voltage across the secondary auxiliary coil L22, and the capacitor C1 detects the voltage rectified by the diode D1.

At this time, while the secondary current I2 flows, the voltage detector 640 outputs a voltage that is higher than each of the breakdown voltage of the first Zener diode ZD1 in the turn-on switch 650 and the breakdown voltage of the second Zener diode ZD2 in the turn-off switch 660, but lower than the sum of the two breakdown voltages.

The current detector 670 detects load current flowing in the first output line OL1 according to the turn ratio between the primary and secondary current detection coils L31 and L32 thereof and provides the detected load current to the current/voltage converter 680.

The current detector 670 also adjusts the on time of the turn-off switch 660 according to the turn ratio between the primary and secondary current detection coils L31 and L32 thereof. Preferably, the turn ratio between the primary and secondary current detection coils L31 and L32 of the current detector 670 is set to turn on the turn-off switch 660 at a predetermined time TD before the main switch MS is turned on, as shown in FIG. 10.

Therefore, it is possible to avoid generation of reverse recovery current in advance.

The current/voltage converter 680 converts the load current detected by the current detector 670 into a voltage and outputs the converted voltage to the ground switch 690. In detail, in the current/voltage converter 680, the voltage VR5 detected by the voltage detection resistor R5 is rectified by the diode D21 and then outputted to the ground switch 690 through the output resistor R4.

That is, when the current detector 670 detects the secondary current, the current/voltage converter 680 outputs a predetermined voltage, for example, a voltage higher than or equal to a turn-on voltage of the ground switch 690. However, when the current detector 670 detects no secondary current, the current/voltage converter 680 outputs a predetermined voltage, for example, a voltage lower than the turn-on voltage of the ground switch 690, namely, a voltage close to zero.

Then, the ground switch 690 switches the connection between the common control terminal CCT and the source of the synchronous switch SS according to the voltage converted by the current/voltage converter 680.

For example, in the case where the current detector 670 detects the secondary current I2, the current/voltage converter 680 outputs a voltage higher than or equal to the turn-on voltage of the fourth transistor Q4 of the NPN type of the ground switch 690, thereby causing the fourth transistor Q4 to be turned on as shown in FIG. 8. As a result, the common control terminal CCT is connected to the source of the synchronous switch SS through the fourth transistor Q4, so that the voltage level thereof becomes substantially a ground level.

With reference to FIGS. 6 and 8, as the fourth transistor Q4 in the ground switch 690 is turned on, the common control terminal CCT is connected to the source of the synchronous switch SS, thereby causing the turn-on switch 650 to be turned on and the turn-off switch 660 to be turned off.

In detail, if the common control terminal CCT is connected to the source of the synchronous switch SS, the voltage level thereof becomes the same as that of the source of the synchronous switch SS, so the output voltage from the voltage detector 640 becomes higher than or equal to the sum of a turn-on voltage of the first transistor Q1 of the turn-on switch 650 and the breakdown voltage of the first Zener diode ZD1 of the turn-on switch 650. Consequently, the first transistor Q1 and the first Zener diode ZD1 are turned on at the same time.

At this time, the output voltage VC1 from the voltage detector 640 is supplied to the gate of the synchronous switch SS through the first transistor Q1 of the turn-on switch 650, so as to turn on the synchronous switch SS. Therefore, the secondary current flows through the synchronous switch SS with little loss, as shown in FIG. 10.

On the contrary, in the case where there is little secondary current I2, namely, the current detector 670 detects little secondary current I2, the current/voltage converter 680 outputs a voltage lower than the turn-on voltage of the fourth transistor Q4 of the NPN type of the ground switch 690, thereby causing the fourth transistor Q4 to be turned off as shown in FIG. 8. As a result, the common control terminal CCT is disconnected from the source of the synchronous switch SS, so that the voltage level thereof becomes substantially the same as the level of the output voltage from the voltage detector 640.

With reference to FIGS. 6 and 8, when the fourth transistor Q4 of the ground switch 690 is turned off, the common control terminal CCT is disconnected from the source of the synchronous switch SS, thereby causing the turn-off switch 660 to be turned on and the turn-on switch 650 to be turned off.

In detail, if the common control terminal CCT is disconnected from the source of the synchronous switch SS, the voltage level thereof becomes substantially the same as the level of the output voltage from the voltage detector 640, so the output voltage from the voltage detector 640 becomes higher than or equal to the sum of the breakdown voltage of the second Zener diode ZD2 of the turn-off switch 660 and turn-on voltages of the second and third transistors Q2 and Q3 of the turn-off switch 660. Consequently, the second Zener diode ZD2 and the second and third transistors Q2 and Q3 are turned on at the same time.

At this time, the same potential is applied to the gate and source of the synchronous switch SS through the third transistor Q3 of the turn-off switch 660, thereby causing the synchronous switch SS to be turned off. As a result, on the basis of the turn ratio between the primary and secondary current detection coils L31 and L32 of the current detector 670, the third transistor Q3 of the turn-off switch 660 is turned on, namely, the synchronous switch SS is turned off, at the predetermined time TD before the main switch MS is turned on, as shown in FIG. 10. In this case, the secondary current flows through a body diode (not shown) of the synchronous switch SS.

That is, provided that the secondary current flows through the body diode of the synchronous switch SS for a brief period of time before the flow thereof is terminated, loss is somewhat high, but it is possible to avoid generation of reverse recovery current in advance.

In brief, the common control terminal CCT has the ground voltage level or substantially the same voltage level as that of the output voltage from the voltage detector 640 according to the operation of the ground switch 690, so that one of the turn-on switch 650 and turn-off switch 660 is selectively turned on.

As described above, in the first embodiment of the flyback converter according to the present invention, the synchronous switch SS is turned off at the predetermined time TD before the main switch MS is turned on, thereby making it possible to avoid generation of reverse recovery current in advance. Therefore, there is no need to use a Schottky diode.

Next, the second embodiment of the flyback converter according to the present invention will be described with reference to FIGS. 7, 8, 9 and 10.

With reference to FIG. 7, in the second embodiment, the flyback switching controller 710 switches the main switch MS in the critical conduction mode on the basis of a feedback voltage to convert the voltage Vs into a high-frequency pulse. This high-frequency pulse is induced from the primary coil L1 of the transformer 720 to the secondary coil L2 thereof.

At this time, the feedback controller 730 detects an output voltage between the first output line OL1 and the second output line OL2 and outputs the detected voltage as the feedback voltage to the flyback switching controller 710.

As shown in FIG. 8, the primary current I1 flows in the primary coil L1 of the transformer 720 when the main switch MS is turned on in response to a switching signal SW, and the secondary current I2 flows in the secondary coil L2 of the transformer 720 when the main switch MS is turned off in response to the switching signal SW.

This operation is performed in the critical conduction mode. That is, in the critical conduction mode applied to the flyback converter of the present invention, the primary current begins to flow at a zero point and the flow of the secondary current is terminated at another zero point, as shown in FIG. 9.

Meanwhile, the synchronous switch SS can be connected to any one of the first output line OL1 or second output line OL2 of the transformer 720. In the second embodiment, as shown in FIG. 7, the synchronous switch SS is implemented with a MOS transistor connected to the second output line OL2.

Referring again to FIG. 7, if the secondary current I2 flows, the voltage detector 740 detects a voltage across the secondary coil L2. That is, in the voltage detector 740, the diode D1 rectifies the voltage across the secondary coil L2, and the capacitor C1 detects the voltage rectified by the diode D1.

At this time, while the secondary current I2 flows, the voltage detector 740 outputs a voltage that is higher than each of the breakdown voltage of the first Zener diode ZD1 in the turn-on switch 750 and the breakdown voltage of the second Zener diode ZD2 in the turn-off switch 760, but lower than the sum of the two breakdown voltages.

The current detector 770 detects load current flowing in the second output line OL2 according to the turn ratio between the primary and secondary current detection coils L31 and L32 thereof and provides the detected load current to the current/voltage converter 780.

The current detector 770 also adjusts the on time of the turn-off switch 760 according to the turn ratio between the primary and secondary current detection coils L31 and L32 thereof. Preferably, the turn ratio between the primary and secondary current detection coils L31 and L32 of the current detector 770 is set to turn on the turn-off switch 760 at a predetermined time TD before the main switch MS is turned on, as shown in FIG. 10.

Therefore, it is possible to avoid generation of reverse recovery current in advance.

The current/voltage converter 780 converts the load current detected by the current detector 770 into a voltage and outputs the converted voltage to the ground switch 790. In detail, in the current/voltage converter 780, the voltage VR5 detected by the voltage detection resistor R5 is rectified by the diode D21 and then outputted to the ground switch 790 through the output resistor R4.

That is, when the current detector 770 detects the secondary current, the current/voltage converter 780 outputs a predetermined voltage, for example, a voltage higher than or equal to a turn-on voltage of the ground switch 790. However, when the current detector 770 detects no secondary current, the current/voltage converter 780 outputs a predetermined voltage, for example, a voltage lower than the turn-on voltage of the ground switch 790, namely, a voltage close to zero.

Then, the ground switch 790 switches the connection between the common control terminal CCT and the source of the synchronous switch SS according to the voltage converted by the current/voltage converter 780.

For example, in the case where the current detector 770 detects the secondary current I2, the current/voltage converter 0.780 outputs a voltage higher than or equal to the turn-on voltage of the fourth transistor Q4 of the NPN type of the ground switch 790, thereby causing the fourth transistor Q4 to be turned on as shown in FIG. 8. As a result, the common control terminal CCT is connected to the source of the synchronous switch SS through the fourth transistor Q4, so that the voltage level thereof becomes substantially a ground level.

With reference to FIGS. 7 and 8, as the fourth transistor Q4 in the ground switch 790 is turned on, the common control terminal CCT is connected to the source of the synchronous switch SS, thereby causing the turn-on switch 750 to be turned on and the turn-off switch 760 to be turned off.

In detail, if the common control terminal CCT is connected to the source of the synchronous switch SS, the voltage level thereof becomes the same as that of the source of the synchronous switch SS, so the output voltage from the voltage detector 740 becomes higher than or equal to the sum of a turn-on voltage of the first transistor Q1 of the turn-on switch 750 and the breakdown voltage of the first Zener diode ZD1 of the turn-on switch 750. Consequently, the first transistor Q1 and the first Zener diode ZD1 are turned on at the same time.

At this time, the output voltage VC1 from the voltage detector 740 is supplied to the gate of the synchronous switch SS through the first transistor Q1 of the turn-on switch 750, so as to turn on the synchronous switch SS. Therefore, the secondary current flows through the synchronous switch SS with little loss, as shown in FIG. 10.

On the other hand, in the case where there is little secondary current I2, namely, the current detector 770 detects little secondary current I2, the current/voltage converter 780 outputs a voltage lower than the turn-on voltage of the fourth transistor Q4 of the NPN type of the ground switch 790, thereby causing the fourth transistor Q4 to be turned off as shown in FIG. 8. As a result, the common control terminal CCT is disconnected from the source of the synchronous switch SS, so that the voltage level thereof becomes substantially the same as the level of the output voltage from the voltage detector 740.

With reference to FIGS. 7 and 8, when the fourth transistor Q4 of the ground switch 790 is turned off, the common control terminal CCT is disconnected from the source of the synchronous switch SS, thereby causing the turn-off switch 760 to be turned on and the turn-on switch 750 to be turned off.

In detail, if the common control terminal CCT is disconnected from the source of the synchronous switch SS, the voltage level thereof becomes substantially the same as the level of the output voltage from the voltage detector 740, so the output voltage from the voltage detector 740 becomes higher than or equal to the sum of the breakdown voltage of the second Zener diode ZD2 of the turn-off switch 760 and turn-on voltages of the second and third transistors Q2 and Q3 of the turn-off switch 760. Consequently, the second Zener diode ZD2 and the second and third transistors Q2 and Q3 are turned on at the same time.

At this time, the same potential is applied to the gate and source of the synchronous switch SS through the third transistor Q3 of the turn-off switch 760, thereby causing the synchronous switch SS to be turned off. As a result, on the basis of the turn ratio between the primary and secondary current detection coils L31 and L32 of the current detector 770, the third transistor Q3 of the turn-off switch 760 is turned on, namely, the synchronous switch SS is turned off, at the predetermined time TD before the main switch MS is turned on, as shown in FIG. 10. In this case, the secondary current flows through a body diode (not shown) of the synchronous switch SS.

That is, provided that the secondary current flows through the body diode of the synchronous switch SS for a brief period of time before the flow thereof is terminated, loss is somewhat high, but it is possible to avoid generation of reverse recovery current in advance.

In brief, the common control terminal CCT has the ground voltage level or substantially the same voltage level as that of the output voltage from the voltage detector 740 according to the operation of the ground switch 790, so that one of the turn-on switch 750 and turn-off switch 760 is selectively turned on.

As described above, in the second embodiment of the flyback converter according to the present invention, the synchronous switch SS is turned off at the predetermined time TD before the main switch MS is turned on, thereby making it possible to avoid generation of reverse recovery current in advance. Therefore, there is no need to use a Schottky diode.

As apparent from the above description, the present invention provides a flyback converter with a synchronous rectifier which is applied to a power supply of a portable computer such as a notebook PC. The flyback converter is operated in a critical conduction mode to turn on/off a main switch at a zero crossing point of an output voltage. The flyback converter is also adapted to control the duty cycle of a synchronous switch using a Zener diode. Therefore, there is no need for a Schottky diode to be connected in parallel with the synchronous switch, resulting in simplification in circuit design.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flyback converter with a synchronous rectifier, comprising:
    a flyback switching controller for switching a main switch in a critical conduction mode on the basis of a feedback voltage to convert an input voltage into a high-frequency pulse;
    a transformer having a primary coil for receiving the high-frequency pulse, and secondary main and auxiliary coils;
    a synchronous switch including a MOSFET having a source and drain connected to any one of first and second output lines connected respectively to both ends of the secondary main coil;
    a feedback controller for detecting an output voltage between the first output line and the second output line and outputting the detected voltage as the feedback voltage to the flyback switching controller;
    a voltage detector for detecting a voltage across the secondary auxiliary coil;
    a turn-on switch for switching a connection between an output terminal of the voltage detector and a gate of the synchronous switch according to a voltage at a common control terminal connected to the output terminal of the voltage detector through a common resistor;
    a turn-off switch for switching a connection between the gate and source of the synchronous switch according to the voltage at the common control terminal connected to the output terminal of the voltage detector through the common resistor;
    a current detector having primary and secondary coils for current detection, the current detector detecting load current flowing in any one of the first and second output lines according to a turn ratio between the primary and secondary current detection coils thereof;
    a current/voltage converter for converting the load current detected by the current detector into a voltage; and
    a ground switch for switching a connection between the common control terminal and the source of the synchronous switch according to the voltage converted by the current/voltage converter.

2. The flyback converter as set forth in claim 1, wherein the voltage detector includes:
    a diode having an anode connected to a positive voltage terminal of the secondary auxiliary coil; and
    a capacitor connected between a negative voltage terminal of the secondary auxiliary coil and a cathode of the diode.

3. The flyback converter as set forth in claim 1, wherein the turn-on switch includes:
    a first transistor of a PNP type having an emitter connected to the output terminal of the voltage detector and a collector connected to the gate of the synchronous switch; and
    a first Zener diode having a cathode connected to a base of the first transistor and an anode connected to the common control terminal.

4. The flyback converter as set forth in claim 3, wherein the first Zener diode has a breakdown voltage lower than the voltage detected by the voltage detector.

5. The flyback converter as set forth in claim 3, wherein the turn-off switch includes:
    a second transistor of an NPN type having a collector connected to the gate of the synchronous switch and an emitter connected to the source of the synchronous switch;
    a third transistor of the NPN type having a collector connected to the collector of the second transistor and an emitter connected to a base of the second transistor; and
    a second Zener diode having an anode connected to a base of the third transistor and a cathode connected to the common control terminal.

6. The flyback converter as set forth in claim 5, wherein the second Zener diode has a breakdown voltage lower than the voltage detected by the voltage detector.

7. The flyback converter as set forth in claim 5, wherein the voltage detector is adapted to output a voltage which is lower than the sum of breakdown voltages of the first and second Zener diodes.

8. The flyback converter as set forth in claim 1, wherein the turn ratio between the primary and secondary current detection coils of the current detector is set to turn on the turn-off switch at a predetermined time before the main switch is turned on.

9. The flyback converter as set forth in claim 1, wherein the current/voltage converter includes:
    a voltage detection resistor for detecting a voltage corresponding to the load current detected by the current detector;
    a diode for rectifying the voltage detected by the voltage detection resistor; and an output resistor connected between the current detector and a cathode of the diode for outputting the voltage rectified by the diode.

10. The flyback converter as set forth in claim 1, wherein the ground switch includes a transistor of an NPN type having a collector connected to the common control terminal, a base connected to an output terminal of the current/voltage converter through a resistor and an emitter connected to the source of the synchronous switch.

11. A flyback converter with a synchronous rectifier, comprising:
 a flyback switching controller for switching a main switch in a critical conduction mode on the basis of a feedback voltage to convert an input voltage into a high-frequency pulse;
 a transformer having a primary coil for receiving the high-frequency pulse and a secondary coil;
 a synchronous switch including a MOSFET having a source and drain connected to any one of first and second output lines connected respectively to both ends of the secondary coil;
 a feedback controller for detecting an output voltage between the first output line and the second output line and outputting the detected voltage as the feedback voltage to the flyback switching controller;
 a voltage detector for detecting a voltage across the secondary coil;
 a turn-on switch for switching a connection between an output terminal of the voltage detector and a gate of the synchronous switch according to a voltage at a common control terminal connected to the output terminal of the voltage detector through a common resistor;
 a turn-off switch for switching a connection between the gate and source of the synchronous switch according to the voltage at the common control terminal connected to the output terminal of the voltage detector through the common resistor;
 a current detector having primary and secondary coils for current detection, the current detector detecting load current flowing in any one of the first and second output lines according to a turn ratio between the primary and secondary current detection coils thereof;
 a current/voltage converter for converting the load current detected by the current detector into a voltage; and
 a ground switch for switching a connection between the common control terminal and the source of the synchronous switch according to the voltage converted by the current/voltage converter.

12. The flyback converter as set forth in claim 11, wherein the voltage detector includes:
 a diode having an anode connected to a positive voltage terminal of the secondary coil of the transformer; and
 a capacitor connected between a negative voltage terminal of the secondary coil of the transformer and a cathode of the diode.

13. The flyback converter as set forth in claim 11, wherein the turn-on switch includes:
 a first transistor of a PNP type having an emitter connected to the output terminal of the voltage detector and a collector connected to the gate of the synchronous switch; and
 a first Zener diode having a cathode connected to a base of the first transistor and an anode connected to the common control terminal.

14. The flyback converter as set forth in claim 13, wherein the first Zener diode has a breakdown voltage lower than the voltage detected by the voltage detector.

15. The flyback converter as set forth in claim 13, wherein the turn-off switch includes:
 a second transistor of an NPN type having a collector connected to the gate of the synchronous switch and an emitter connected to the source of the synchronous switch;
 a third transistor of the NPN type having a collector connected to the collector of the second transistor and an emitter connected to a base of the second transistor; and
 a second Zener diode having an anode connected to a base of the third transistor and a cathode connected to the common control terminal.

16. The flyback converter as set forth in claim 15, wherein the second Zener diode has a breakdown voltage lower than the voltage detected by the voltage detector.

17. The flyback converter as set forth in claim 15, wherein the voltage detector is adapted to output a voltage which is lower than the sum of breakdown voltages of the first and second Zener diodes.

18. The flyback converter as set forth in claim 11, wherein the turn ratio between the primary and secondary current detection coils of the current detector is set to turn on the turn-off switch at a predetermined time before the main switch is turned on.

19. The flyback converter as set forth in claim 11, wherein the current/voltage converter includes:
 a voltage detection resistor for detecting a voltage corresponding to the load current detected by the current detector;
 a diode for rectifying the voltage detected by the voltage detection resistor; and
 an output resistor connected between the current detector and a cathode of the diode for outputting the voltage rectified by the diode.

20. The flyback converter as set forth in claim 11, wherein the ground switch includes a transistor of an NPN type having a collector connected to the common control terminal, a base connected to an output terminal of the current/voltage converter through a resistor and an emitter connected to the source of the synchronous switch.

* * * * *